US012738540B2

(12) United States Patent
Lee et al.

(10) Patent No.: US 12,738,540 B2
(45) **Date of Patent: *Sep. 15, 2026**

(54) NON-AQUEOUS ELECTROLYTE AND LITHIUM SECONDARY BATTERY INCLUDING THE SAME

(71) Applicant: LG Energy Solution, Ltd., Seoul (KR)

(72) Inventors: Jung Min Lee, Daejeon (KR); Jung Gu Han, Daejeon (KR); Su Hyeon Ji, Daejeon (KR); Chul Eun Yeom, Daejeon (KR); Chul Haeng Lee, Daejeon (KR); Kyung Mi Lee, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 700 days.

This patent is subject to a terminal disclaimer.

(21) Appl. No.: 18/105,382

(22) Filed: Feb. 3, 2023

(65) Prior Publication Data

US 2023/0253624 A1 Aug. 10, 2023

(30) Foreign Application Priority Data

Feb. 8, 2022 (KR) ........................ 10-2022-0016541

(51) Int. Cl.

| | |
|---|---|
| ***H01M 10/0567*** | (2010.01) |
| ***H01M 4/36*** | (2006.01) |
| ***H01M 4/38*** | (2006.01) |
| ***H01M 4/48*** | (2010.01) |
| ***H01M 4/505*** | (2010.01) |
| ***H01M 4/525*** | (2010.01) |
| ***H01M 4/583*** | (2010.01) |
| ***H01M 4/587*** | (2010.01) |
| ***H01M 10/052*** | (2010.01) |
| ***H01M 10/0568*** | (2010.01) |
| ***H01M 10/0569*** | (2010.01) |
| *H01M 4/02* | (2006.01) |
| *H01M 4/86* | (2006.01) |

(52) U.S. Cl.
CPC ....... *H01M 10/0567* (2013.01); *H01M 4/362* (2013.01); *H01M 4/364* (2013.01); *H01M 4/386* (2013.01); *H01M 4/483* (2013.01); *H01M 4/505* (2013.01); *H01M 4/525* (2013.01); *H01M 4/583* (2013.01); *H01M 4/587* (2013.01); *H01M 10/052* (2013.01); *H01M 10/0568* (2013.01); *H01M 10/0569* (2013.01); *H01M 2004/027* (2013.01); *H01M 2004/028* (2013.01); *H01M 2004/8684* (2013.01); *H01M 2004/8689* (2013.01); *H01M 2300/0025* (2013.01); *H01M 2300/0028* (2013.01)

(58) Field of Classification Search
CPC .. H01M 10/0567; H01M 4/362; H01M 4/364; H01M 4/386; H01M 4/505; H01M 4/525; H01M 4/587
USPC .......................................................... 429/200
See application file for complete search history.

(56) References Cited

U.S. PATENT DOCUMENTS

| | | | | |
|---|---|---|---|---|
| 9,780,358 | B2 | 10/2017 | Masarapu et al. | |
| 10,227,493 | B2 * | 3/2019 | Nakanishi | C07F 9/4012 |
| 11,862,764 | B2 * | 1/2024 | Lee | H01M 10/0568 |
| 12,243,985 | B2 * | 3/2025 | Lee | H01M 10/0525 |
| 2013/0344388 | A1 | 12/2013 | Simonin et al. | |
| 2014/0065483 | A1 * | 3/2014 | Park | H01M 4/366 252/519.15 |
| 2015/0104706 | A1 * | 4/2015 | Wu | H01M 4/505 429/231 |
| 2017/0263931 | A1 | 9/2017 | Wu et al. | |
| 2020/0203722 | A1 | 6/2020 | Hotta et al. | |
| 2022/0209299 | A1 | 6/2022 | Lee et al. | |
| 2023/0090340 | A1 | 3/2023 | Lee et al. | |
| 2023/0105288 | A1 * | 4/2023 | Lee | H01M 10/0567 429/338 |
| 2024/0204250 | A1 | 6/2024 | Lee et al. | |

FOREIGN PATENT DOCUMENTS

| | | | |
|---|---|---|---|
| CN | 102569889 | A | 7/2012 |
| EP | 4318712 | A1 | 2/2024 |
| EP | 4329038 | A1 | 2/2024 |
| JP | H1050344 | A | 2/1998 |
| JP | 2000156243 | A | 6/2000 |
| JP | 2001143748 | A | 5/2001 |

(Continued)

OTHER PUBLICATIONS

English Translation of JP 3680454 B2 (Year: 2025).*
Extended European Search Report including Written Opinion for Application No. 23753161 .1 dated Sep. 6, 2024, pp. 1-12.

*Primary Examiner* — Osei K Amponsah
*Assistant Examiner* — Kevin Nguyen
(74) *Attorney, Agent, or Firm* — Lerner David LLP

(57) ABSTRACT

The present disclosure relates to a non-aqueous electrolyte including an organic solvent, a lithium salt, and a coumarin-based compound represented by the following Chemical Formula 1 and a lithium secondary battery including the non-aqueous electrolyte:

[Chemical Formula 1]

in Chemical Formula 1, R is a substituent including one or more elements selected from the group consisting of C, O, N, B, S, P, Si, and F, and n is an integer of 1 to 6.

14 Claims, No Drawings

(56) References Cited

FOREIGN PATENT DOCUMENTS

| | | | |
|---|---|---|---|
| JP | 3680454 | B2 | 8/2005 |
| JP | 2007012507 | A | 1/2007 |
| JP | 4385586 | B2 | 12/2009 |
| JP | 2012043586 | A | 3/2012 |
| JP | 5002918 | B2 | 8/2012 |
| JP | 2014506387 | A | 3/2014 |
| JP | 5749116 | B2 | 7/2015 |
| JP | 2018503218 | A | 2/2018 |
| JP | 2018081742 | A | 5/2018 |
| JP | 6951307 | B2 | 10/2021 |
| JP | 2024521798 | A | 6/2024 |
| KR | 20140049650 | A | 4/2014 |
| KR | 20210060330 | A | 5/2021 |
| WO | 2021101174 | A1 | 5/2021 |

* cited by examiner

NON-AQUEOUS ELECTROLYTE AND LITHIUM SECONDARY BATTERY INCLUDING THE SAME

CROSS-REFERENCE TO RELATED APPLICATIONS

This application claims the priority from Korean Patent Application No. 10-2022-0016541 filed on Feb. 8, 2022, the disclosure of which is incorporated herein by reference.

BACKGROUND OF THE INVENTION

The present disclosure relates to a non-aqueous electrolyte and a lithium secondary battery including the same, and more specifically, to a non-aqueous electrolyte including a coumarin-based compound having at least one substituent and a lithium secondary battery including the same.

Recently, interest in energy storage technology has been increased, and as the application field thereof is expanded to energy for mobile phones, camcorders, notebook PCs, and even electric vehicles, efforts for research and development of electrochemical devices are gradually becoming actualized.

Among electrochemical devices, interest in the development of secondary batteries that are able to be charged and discharged is rising, and particularly, lithium secondary batteries developed in the early 1990s are in the spotlight due to having high operating voltage and a very high energy density.

Lithium secondary batteries are generally manufactured by interposing a separator between a positive electrode including a positive electrode active material comprising a lithium-containing transition metal oxide and a negative electrode including a negative electrode active material capable of storing lithium ions to form an electrode assembly, placing the electrode assembly in a battery case, injecting a non-aqueous electrolyte that is a medium for transferring lithium ions, and then sealing the battery case. The non-aqueous electrolyte generally comprises a lithium salt and an organic solvent capable of dissolving the lithium salt.

Recently, as demand for secondary batteries having a high energy density, such as batteries for electric vehicles, increases, high-voltage secondary batteries driven at a high voltage are being actively developed. However, when driving voltage increases, structural collapse, transition metal elution, and gas generation occur at the positive electrode surface, and thus decomposition of an electrolyte is accelerated, resulting in rapid deterioration of the lifespan characteristics of batteries.

In addition, recently, batteries using a lithium-manganese-rich (Mn-rich) positive electrode active material, which is cheaper and has excellent stability compared to a conventional lithium-nickel-based positive electrode active material, is being developed to reduce the manufacturing costs of batteries for electric vehicles. In the case of the batteries using a lithium-manganese-rich positive electrode active material, it is required to perform an initial activation process at a high voltage of 4.6 V or more, and reactive oxygen species are generated in the activation process, resulting in a side reaction with an electrolyte and an increase in resistance.

Therefore, there is a demand for the development of a non-aqueous electrolyte capable of suppressing the generation of gas under a high voltage condition and the deterioration of a positive electrode.

SUMMARY OF THE INVENTION

The present disclosure has been made to solve the above problems and is directed to providing a non-aqueous electrolyte which is capable of suppressing the generation of gas or the production of resistor by-products by removing reactive oxygen species generated under a high voltage condition by including a coumarin-based compound having at least one functional group as an additive.

The present disclosure is also directed to providing a lithium secondary battery which exhibits excellent lifespan characteristics and swelling characteristics even under a high voltage condition by including the above-described non-aqueous electrolyte.

One aspect of the present disclosure provides a non-aqueous electrolyte including an organic solvent, a lithium salt, and a coumarin-based compound represented by the following Chemical Formula 1.

[Chemical Formula 1]

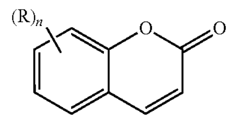

In Chemical Formula 1, R is a substituent including one or more elements selected from the group consisting of C, O, N, B, S, P, Si, and F, and n is an integer of 1 to 6. Specifically, R may include a halogen, a nitrile group, an alkynyl group, a propargyl group, an ester group, an ether group, a ketone group, a carboxyl group, a substituted or unsubstituted alkyl group, a substituted or unsubstituted alkoxy group, a boron group, a borate group, an isocyanate group, an isothiocyanate group, a silyl group, a siloxane group, or a combination thereof. More specifically, R may be a nitrile group, an alkynyl group having 2 to 10 carbon atoms, a propargyl group, COOR', O—R", COR"', or an alkyl group having 1 to 10 carbon atoms unsubstituted or substituted with at least one halogen, wherein R' may be a propargyl group, R" may be a propargyl group or a silyl group substituted with at least one alkyl group having 1 to 5 carbon atoms, and R"' may be an alkyl group having 1 to 5 carbon atoms unsubstituted or substituted with at least one halogen.

More specifically, the coumarin-based compound may be a compound represented by the following Chemical Formula 1-1 or Chemical Formula 1-2.

[Chemical Formula 1-1]

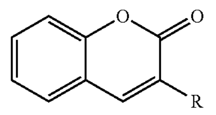

[Chemical Formula 1-2]

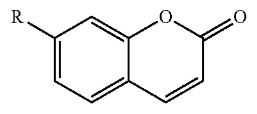

In Chemical Formula 1-1 and Chemical Formula 1-2, R may be a substituent including one or more elements selected from the group consisting of C, O, N, B, S, P, Si, and F. Specifically, R may include a halogen, a nitrile group, an alkynyl group, a propargyl group, an ester group, an ether group, a ketone group, a carboxyl group, a substituted or unsubstituted alkyl group, a substituted or unsubstituted alkoxy group, a boron group, a borate group, an isocyanate group, an isothiocyanate group, a silyl group, a siloxane group, or a combination thereof. More specifically, R may be a nitrile group, an alkynyl group having 2 to 10 carbon atoms, a propargyl group, COOR', O—R", COR'", or an alkyl group having 1 to 10 carbon atoms unsubstituted or substituted with at least one halogen, wherein R' may be a propargyl group, R" may be a propargyl group or a silyl group substituted with at least one alkyl group having 1 to 5 carbon atoms, and R'" may be an alkyl group having 1 to 5 carbon atoms unsubstituted or substituted with at least one halogen.

Even more specifically, the coumarin-based compound may be selected from the group consisting of compounds represented by the following Chemical Formula 1A to Chemical Formula 1G.

[Chemical Formula 1A]

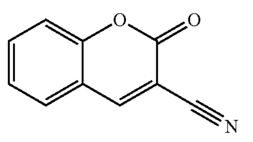

[Chemical Formula 1B]

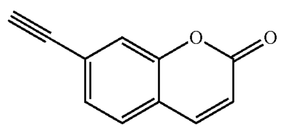

[Chemical Formula 1C]

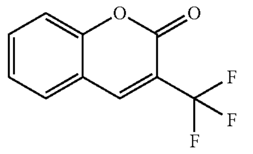

[Chemical Formula 1D]

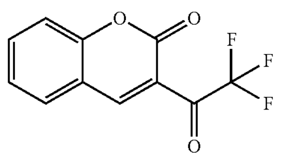

[Chemical Formula 1E]

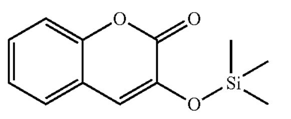

[Chemical Formula 1F]

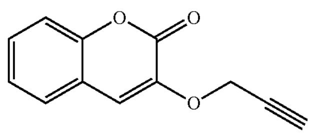

[Chemical Formula 1G]

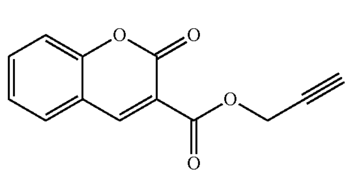

Meanwhile, the coumarin-based compound may be included in an amount of 0.5 wt % to 3 wt %, preferably 0.5 wt % to 2 wt %, and more preferably 0.5 wt % to 1 wt % based on the total weight of the non-aqueous electrolyte.

The non-aqueous electrolyte according to the present disclosure may further include a halogenated cyclic carbonate, and the halogenated cyclic carbonate is preferably fluorinated ethylene carbonate. The halogenated cyclic carbonate may be included in an amount of 0.5 wt % to 10 wt %, preferably 0.5 wt % to 8 wt %, and more preferably 1 wt % to 5 wt % based on the total weight of the non-aqueous electrolyte.

Another aspect of the present disclosure provides a lithium secondary battery including: a positive electrode including a positive electrode active material; a negative electrode including a negative electrode active material; and the above-described non-aqueous electrolyte according to the present disclosure.

Preferably, the positive electrode active material may include a lithium-manganese-based oxide represented by the following Chemical Formula 2.

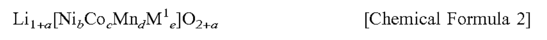

$$Li_{1+a}[Ni_bCo_cMn_dM^1_e]O_{2+a} \quad \text{[Chemical Formula 2]}$$

In Chemical Formula 2, $0.05 \le a \le 1$, $0 \le b \le 0.5$, $0 \le c \le 0.1$, $0.5 \le d \le 1.0$, and $0 \le e \le 0.2$ are satisfied, and $M^1$ is at least one selected from the group consisting of metal ions such as Al, B, Co, W, Mg, V, Ti, Zn, Ga, In, Ru, Nb, Sn, Sr, and Zr.

More specifically, the positive electrode active material may include a lithium-manganese-based oxide represented by the following Chemical Formula 2-1.

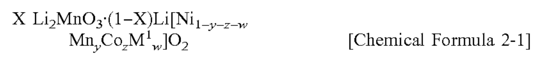

$$X\ Li_2MnO_3\cdot(1-X)Li[Ni_{1-y-z-w}Mn_yCo_zM^1_w]O_2 \quad \text{[Chemical Formula 2-1]}$$

In Chemical Formula 2-1, $0.3 \le X \le 0.5$, $0.5 \le y < 1$, $0 \le z \le 0.3$, and $0 \le w \le 0.2$ are satisfied, and $M^1$ is at least one selected from the group consisting of metal ions such as Al, B, Co, W, Mg, V, Ti, Zn, Ga, In, Ru, Nb, Sn, Sr, and Zr.

Meanwhile, the negative electrode active material may include a silicon-based negative electrode active material. The silicon-based negative electrode active material may be selected, for example, from the group consisting of Si, $SiO_m$ (wherein $0 < m \le 2$), a Si—C composite, a Si—$M^a$ alloy ($M^a$ is one or more selected from the group consisting of Al, Sn, Mg, Cu, Fe, Pb, Zn, Mn, Cr, Ti, and Ni), and a combination thereof. As necessary, the negative electrode active material may further include a carbon-based negative electrode active material.

DETAILED DESCRIPTION OF THE INVENTION

Hereinafter, the present disclosure will be described in detail.

Unless otherwise defined, the term "substituted" means that at least one hydrogen bonded to carbon is substituted with an element other than hydrogen, for example, it means "substituted" with a halogen, an alkyl group having 1 to 20 carbon atoms, an alkenyl group having 2 to 20 carbon atoms, an alkynyl group having 2 to 20 carbon atoms, an alkoxy group having 1 to 20 carbon atoms, a cycloalkyl group having 3 to 12 carbon atoms, a cycloalkenyl group having 3 to 12 carbon atoms, a heterocycloalkyl group having 3 to 12 carbon atoms, a heterocycloalkenyl group having 3 to 12 carbon atoms, an aryloxy group having 6 to 12 carbon atoms, a fluoroalkyl group having 1 to 20 carbon atoms, a nitro group, an aryl group having 6 to 20 carbon atoms, a heteroaryl group having 2 to 20 carbon atoms, a haloaryl group having 6 to 20 carbon atom, etc.

Non-Aqueous Electrolyte

A non-aqueous electrolyte according to the present disclosure includes (1) an organic solvent, (2) a lithium salt, and (3) a coumarin-based compound represented by the following Chemical Formula 1.

(1) Organic Solvent

In the present disclosure, the organic solvent may include a cyclic carbonate-based solvent, a linear carbonate-based solvent, a linear ester-based solvent, or a mixture thereof.

The cyclic carbonate-based solvent is an organic solvent which has high viscosity and effectively dissociates a lithium salt in the electrolyte due to its high dielectric constant and may be, for example, at least one selected from the group consisting of ethylene carbonate (EC), propylene carbonate (PC), 1,2-butylene carbonate, 2,3-butylene carbonate, 1,2-pentylene carbonate, 2,3-pentylene carbonate, and vinylene carbonate. Specifically, the cyclic carbonate-based solvent may be EC, PC, or a mixture thereof.

The linear carbonate-based solvent is an organic solvent which has low viscosity and a low dielectric constant and may be, for example, at least one selected from the group consisting of dimethyl carbonate (DMC), diethyl carbonate (DEC), dipropyl carbonate, ethyl methyl carbonate (EMC), methyl propyl carbonate, and ethyl propyl carbonate.

The linear ester-based solvent may be, for example, at least one selected from the group consisting of methyl acetate, ethyl acetate, propyl acetate, methyl propionate, ethyl propionate, propyl propionate, and butyl propionate.

Preferably, the organic solvent may be a mixture of the cyclic carbonate-based solvent and the linear carbonate-based solvent. In this case, the cyclic carbonate-based solvent and the linear carbonate-based solvent may be mixed in a volume ratio of 10 to 40:60 to 90, preferably 10 to 30:70 to 90, and more preferably 15 to 30:70 to 85. When the content of the cyclic carbonate-based solvent and the linear carbonate-based solvent satisfies the above-described range, both a high dielectric constant and low viscosity can be satisfied, and excellent ion conductivity can be implemented.

(2) Lithium Salt

As the lithium salt used in the present disclosure, various lithium salts typically used in an electrolyte for a lithium secondary battery may be used without limitation. For example, the lithium salt may contain $Li^+$ as a cation and at least one selected from the group consisting of $F^-$, $Cl^-$, $Br^-$, $I^-$, $NO_3^-$, $N(CN)_2^-$, $BF_4^-$, $ClO_4^-$, $AlO_4^-$, $AlCl_4^-$, $PF_6^-$, $SbF_6^-$, $AsF_6^-$, $B_{10}Cl_{10}^-$, $BF_2C_2O_4^-$, $BC_4O_8^-$, $PF_4C_2O_4^-$, $PF_2C_4O_8^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $C_4F_9SO_3^-$, $CF_3CF_2SO_3^-$, $(FSO_2)_2N^-$, $CF_3CF_2(CF_3)_2CO^-$, $(CF_3SO_2)_2CH^-$, $CH_3SO_3^-$, $CF_3(CF_2)_7SO_3^-$, $CF_3CO_2^-$, $CH_3CO_2^-$, $SCN^-$, and $(CF_3CF_2SO_2)_2N^-$ as an anion.

Specifically, the lithium salt may be at least one selected from the group consisting of LiCl, LiBr, LiI, $LiBF_4$, $LiClO_4$, $LiAlO_4$, $LiAlCl_4$, $LiPF_6$, $LiSbF_6$, $LiAsF_6$, $LiB_{10}Cl_{10}$, LiBOB ($LiB(C_2O_4)_2$), $LiCF_3SO_3$, LiTFSI ($LiN(SO_2CF_3)_2$), LiFSI ($LiN(SO_2F)_2$), $LiCH_3SO_3$, $LiCF_3CO_2$, $LiCH_3CO_2$, and LiBETI ($LiN(SO_2CF_2CF_3)_2$. Specifically, the lithium salt may include one selected from the group consisting of $LiBF_4$, $LiClO_4$, $LiPF_6$, LiBOB ($LiB(C_2O_4)_2$), $LiCF_3SO_3$, LiTFSI ($LiN(SO_2CF_3)_2$), LiFSI (($LiN(SO_2F)_2$), and LiBETI ($LiN(SO_2CF_2CF_3)_2$ or a mixture of two or more thereof.

The lithium salt may be included at a concentration of 0.8 M to 4 M, preferably 0.8 M to 2 M, and more preferably 0.8 M to 1.6 M in the electrolyte. When the concentration of the lithium salt satisfies the above-described range, the lithium ion ($Li^+$) transference number and the degree of dissociation of lithium ions are enhanced, and thus the output characteristics of a battery can be enhanced.

(3) Coumarin-Based Compound

The non-aqueous electrolyte according to the present disclosure includes a coumarin-based compound represented by the following Chemical Formula 1.

[Chemical Formula 1]

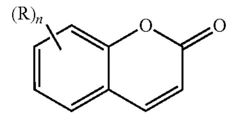

In Chemical Formula 1, R is a substituent including one or more elements selected from the group consisting of C, O, N, B, S, P, Si, and F, and n is an integer of 1 to 6. Specifically, R may include a halogen, a nitrile group, an alkynyl group, a propargyl group, an ester group, an ether group, a ketone group, a carboxyl group, a substituted or unsubstituted alkyl group, a substituted or unsubstituted alkoxy group, a boron group, a borate group, an isocyanate group, an isothiocyanate group, a silyl group, a siloxane group, or a combination thereof. More specifically, R may be a nitrile group, an alkynyl group having 2 to 10 carbon atoms, a propargyl group, COOR', O—R", COR'", or an alkyl group having 1 to 10 carbon atoms unsubstituted or substituted with at least one halogen, wherein R' may be a propargyl group, R" may be a propargyl group or a silyl group substituted with at least one alkyl group having 1 to 5 carbon atoms, and R'" may be an alkyl group having 1 to 5 carbon atoms unsubstituted or substituted with at least one halogen.

Since the coumarin-based compound represented by Chemical Formula 1 has a higher energy for reaction with reactive oxygen species than an organic solvent such as ethylene carbonate or the like, when reactive oxygen species are generated, the coumarin-based compound binds to the reactive oxygen species before the organic solvent does. Therefore, when the coumarin-based compound of Chemical Formula 1 is included in the non-aqueous electrolyte, the reactive oxygen species generated in an initial activation process of a high-voltage battery may be scavenged by the coumarin-based compound to suppress the decomposition of an organic solvent caused by the reactive oxygen species, and accordingly, the generation of gas caused by the decomposition of an organic solvent or the production of resistor by-products may be minimized.

In addition, since the coumarin-based compound of Chemical Formula 1 includes a substituent including one or more elements selected from the group consisting of C, O, N, B, S, P, Si, and F, a SEI film is formed on the surface of a positive electrode and/or a negative electrode to suppress the direct contact between the electrode and the electrolyte, and thus an effect of reducing swelling and gas generation at high temperature and improving lifespan may be obtained.

More specifically, the coumarin-based compound may be a compound represented by the following Chemical Formula 1-1 or Chemical Formula 1-2.

[Chemical Formula 1-1]

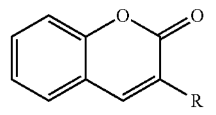

[Chemical Formula 1-2]

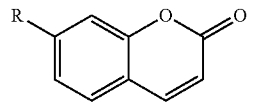

In Chemical Formula 1-1 and Chemical Formula 1-2, R is a substituent including one or more elements selected from the group consisting of C, O, N, B, S, P, Si, and F. Specifically, R may include a halogen, a nitrile group, an alkynyl group, a propargyl group, an ester group, an ether group, a ketone group, a carboxyl group, a substituted or unsubstituted alkyl group, a substituted or unsubstituted alkoxy group, a boron group, a borate group, an isocyanate group, an isothiocyanate group, a silyl group, a siloxane group, or a combination thereof. More specifically, R may be a nitrile group, an alkynyl group having 2 to 10 carbon atoms, a propargyl group, COOR', O—R", COR'", or an alkyl group having 1 to 10 carbon atoms unsubstituted or substituted with at least one halogen, wherein R' may be a propargyl group, R" may be a propargyl group or a silyl group substituted with at least one alkyl group having 1 to 5 carbon atoms, and R'" may be an alkyl group having 1 to 5 carbon atoms unsubstituted or substituted with at least one halogen.

Even more specifically, the coumarin-based compound may be selected from the group consisting of compounds represented by the following Chemical Formula 1A to Chemical Formula 1G.

[Chemical Formula 1A]

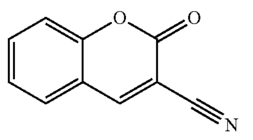

[Chemical Formula 1B]

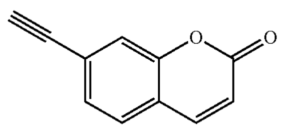

[Chemical Formula 1C]

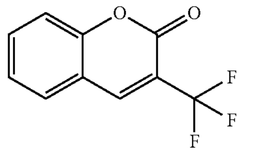

[Chemical Formula 1D]

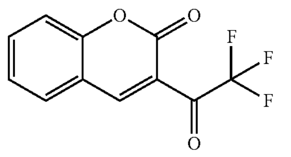

[Chemical Formula 1E]

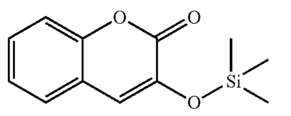

[Chemical Formula 1F]

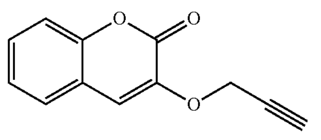

[Chemical Formula 1G]

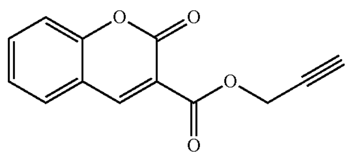

Meanwhile, the coumarin-based compound may be included in an amount of 0.5 wt % to 3 wt %, preferably 0.5 wt % to 2 wt %, and more preferably 0.5 wt % to 1 wt % based on the total weight of the non-aqueous electrolyte. When the content of the coumarin-based compound satisfies the above-described range, a robust SEI film can be formed on a positive electrode and a negative electrode, and an oxygen radical compound generated at a positive electrode can be effectively removed, and thus battery performance can be improved. When the content of the coumarin-based compound excessively increases, resistance increases, and thus battery performance may be adversely affected.

(4) Other Components

Meanwhile, although not essential, the non-aqueous electrolyte according to the present disclosure may further include additives in addition to the above-described components to further enhance the properties of a secondary battery.

The additive may be, for example, at least one selected from the group consisting of a cyclic carbonate-based compound, a halogen-substituted carbonate-based compound, a sultone-based compound, a sulfate-based compound, a phosphate-based compound, a borate-based compound, a benzene-based compound, an amine-based compound, a silane-based compound, and a lithium salt-based compound.

The cyclic carbonate-based compound may be, for example, vinylene carbonate (VC), vinyl ethylene carbonate (VEC), or the like.

The halogen-substituted carbonate-based compound may be, for example, fluoroethylene carbonate (FEC) or the like.

The sultone-based compound may be, for example, 1,3-propanesultone, 1,3-propenesultone, or the like.

The sulfate-based compound may be, for example, ethylene sulfate (Esa), trimethylene sulfate (TMS), methyl trimethylene sulfate (MTMS), or the like.

The phosphate-based compound may be, for example, one or more compounds selected from the group consisting of lithium difluoro(bisoxalato)phosphate, lithium difluorophosphate, tetramethyl trimethyl silyl phosphate, trimethyl silyl phosphite, tris(2,2,2-trifluoroethyl) phosphate, and tris (trifluoroethyl) phosphite.

The borate-based compound may be, for example, tetraphenylborate, lithium oxalyldifluoroborate (LiODFB), or the like.

The benzene-based compound may be, for example, fluorobenzene or the like, the amine-based compound may be triethanolamine, ethylenediamine, or the like, and the silane-based compound may be tetravinylsilane or the like.

The lithium salt-based compound is a compound different from the lithium salt included in the non-aqueous electrolyte and may be one or more compounds selected from the group consisting of $LiPO_2F_2$, LiODFB, LiBOB (lithium bisoxalatoborate ($LiB(C_2O_4)_2$), and $LiBF_4$.

Meanwhile, the additives may be used alone or in combination of two or more thereof.

The additives may be included in an amount of 0.1 to 20 wt %, preferably, 0.1 to 15 wt % based on the total weight of the electrolyte. When the additive is included in the above-described content range, a film can be stably formed on an electrode, ignition can be suppressed during overcharging, side reactions during an initial activation process of a secondary battery can be prevented from occurring, and the additives can be prevented from remaining or being precipitated.

Among the above-described additives, the halogen-substituted carbonate-based compound, for example, fluoroethylene carbonate (FEC), is preferably further included. When the halogen-substituted carbonate-based compound is used as the additive, the oxidation stability of the electrolyte increases, and thus high-voltage performance may be improved. Also, a SEI film is formed on the surface of a positive electrode to stabilize a positive electrode interface, and thus lifespan characteristics may be improved. However, when FEC is used alone, oxidative decomposition excessively occurs at a positive electrode interface, and thus a LiF component and the like are deposited on a positive electrode surface to increase resistance, and side reactions such as the generation of $CO_2$ gas and the production of HF increase, leading to a side effect of accelerating the decomposition of the electrolyte. However, when the halogen-substituted carbonate-based compound and the coumarin-based compound are used together, an anodic oxidation reaction of the halogen-substituted carbonate-based compound is suppressed due to the mechanism in which the coumarin-based compound forms a film on a positive electrode, and thus the occurrence of the above side effect may be minimized.

In this case, the halogen-substituted carbonate-based compound may be included in an amount of 0.5 wt % to 10 wt %, preferably 0.5 wt % to 8 wt %, and more preferably 1 wt % to 5 wt % based on the total weight of the non-aqueous electrolyte. When the content of the halogen-substituted carbonate-based compound satisfies the above-described range, an effect of improving high-voltage performance due to an increase in oxidation stability of the electrolyte and an effect of improving lifespan characteristics due to the formation of a SEI film can be obtained.

Lithium Secondary Battery

Next, a lithium secondary battery according to the present disclosure will be described.

A lithium secondary battery according to the present disclosure includes a positive electrode including a positive electrode active material, a negative electrode including a negative electrode active material, and a non-aqueous electrolyte. More specifically, the lithium secondary battery may include a positive electrode, a negative electrode, a separator interposed between the positive electrode and the negative electrode, and a non-aqueous electrolyte. In this case, the non-aqueous electrolyte is the above-described non-aqueous electrolyte according to the present disclosure, that is, the non-aqueous electrolyte including the organic solvent, the lithium salt, and the coumarin-based compound represented by Chemical Formula 1. Since the non-aqueous electrolyte has been described above, a description thereof will be omitted, and other components will be described below.

Positive Electrode

The positive electrode may include a positive electrode active material layer including a positive electrode active material, and the positive electrode active material layer may further include a conductive material and/or a binder as necessary.

The positive electrode active material is a compound capable of reversible intercalation and deintercalation of lithium, and various positive electrode active materials used in the art, for example, a lithium-manganese-based oxide (e.g., $LiMnO_2$, $LiMn_2O_4$, etc.), a lithium-cobalt-based oxide (e.g., $LiCoO_2$, etc.), a lithium-nickel-based oxide (e.g., $LiNiO_2$, etc.), a lithium-nickel-manganese-based oxide (e.g., $LiNi_{1-Y}Mn_YO_2$ (0<Y<1), $LiMn_{2-z}Ni_zO_4$ (0<Z<2)), a lithium-nickel-cobalt-based oxide (e.g., $LiNi_{1-Y1}Co_{Y1}O_2$ (0<Y1<1)), a lithium-manganese-cobalt-based oxide (e.g., $LiCo_{1-Y2}Mn_{Y2}O_2$ (0<Y2<1), $LiMn_{2-z1}Co_{z1}O_4$ (0<Z1<2)), a lithium-nickel-manganese-cobalt-based oxide (e.g., $Li(Ni_{p1}Co_{q1}Mn_{r1})O_2$ (0<p1<1, 0<q1<1, 0<r1<1, p1+q1+r1=1) or $Li(Ni_{p2}Co_{q2}Mn_{r2})O_4$ (0<p2<2, 0<q2<2, 0<r2<2, p2+q2+r2=2)), a lithium-nickel-cobalt-transition metal (M) oxide (e.g., $Li(Ni_{p3}Co_{q3}Mn_{r3}M_{s3})O_2$ (M is selected from the group consisting of Al, Fe, V, Cr, Ti, Ta, Mg, and Mo, and p3, q3, r3, and s3 are respective atomic fractions of elements and satisfy 0<p3<1, 0<q3<1, 0<r3<1, 0<s3<1, p3+q4+r3+s3=1)), and the like may be used.

Preferably, the positive electrode active material may include a lithium-manganese-rich oxide including Mn in an amount of 50 mol % or more among all metals excluding lithium and having a molar ratio of lithium to a transition metal of more than 1.

When a lithium-manganese-based oxide containing an excessive amount of lithium is used as the positive electrode active material, irreversible capacity of Si is compensated due to an excessive amount of lithium contained in the positive electrode active material in an initial activation process, and thus it may be balanced with a silicon-based negative electrode even without a separate compensation material such as a sacrificial positive electrode material or a prior lithium compensation process such as pre-lithiation. Specifically, the lithium-manganese-rich oxide has a structure in which a layered form ($LMO_2$) and a halite phase ($Li_2MnO_3$) are mixed in the positive electrode active material, and irreversible capacity of Si is compensated due to lithium generated by decomposing a halite-phase lithium manganese oxide in an initial activation process. To this end, the initial activation process needs to proceed at a high voltage of 4.6 V or more, and reactive oxygen species are generated during decomposition of a halite-phase lithium manganese oxide. The reactive oxygen species attack and decompose an organic solvent such as ethylene carbonate to generate gas and resistor by-products, thereby degrading the properties of a battery. However, in the present disclosure, since the non-aqueous electrolyte includes a coumarin-based compound that is more reactive with reactive oxygen species than an organic solvent, the coumarin-based compound is combined with reactive oxygen species generated in an initial activation process before the organic solvent does, and thus side effects caused by decomposition of the organic solvent may be minimized.

Specifically, the lithium-manganese-based oxide may be represented by the following Chemical Formula 2.

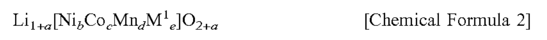

$Li_{1+a}[Ni_bCo_cMn_dM^1_e]O_{2+a}$ [Chemical Formula 2]

In Chemical Formula 2, 0.05≤a≤1, 0≤b≤0.5, 0≤c≤0.3, 0.5≤d<1.0, and 0≤e≤0.2, preferably 0.05≤a≤1.0, 0.1≤b≤0.5, 0≤c≤0.1, 0.5≤d<1.0, and 0≤e≤0.2, and more preferably 0.10≤a≤0.50, 0.1≤b≤0.5, 0≤c≤0.1, 0.6≤d<1.0, and 0≤e≤0.1 may be satisfied.

In addition, $M^1$ may be at least one selected from the group consisting of metal ions such as Al, B, Co, W, Mg, V, Ti, Zn, Ga, In, Ru, Nb, Sn, Sr, and Zr.

More specifically, the lithium-manganese-based oxide may be represented by the following Chemical Formula 2-1.

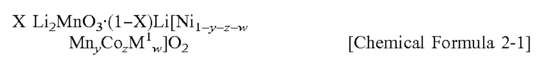

$X\ Li_2MnO_3\cdot(1-X)Li[Ni_{1-y-z-w}Mn_yCo_zM^1_w]O_2$ [Chemical Formula 2-1]

In Chemical Formula 2-1, 0.1≤X≤0.5, 0.5≤y<1, 0≤z≤0.3, and 0≤w≤0.2, preferably 0.2≤X≤0.5, 0.5≤y<1, 0≤z≤0.1, and 0≤w≤0.2, and more preferably 0.3≤X≤0.5, 0.6≤y<1, 0≤z≤0.1, and 0≤w≤0.2 may be satisfied.

In addition, $M^1$ may be at least one selected from the group consisting of metal ions such as Al, B, Co, W, Mg, V, Ti, Zn, Ga, In, Ru, Nb, Sn, Sr, and Zr.

The lithium-manganese-based oxide may be prepared by mixing a transition metal precursor and a lithium source material and then firing the resulting mixture. In this case, the transition metal precursor and the lithium source material may be mixed in an amount such that a molar ratio of all transition metals (Ni+Co+Mn):Li is 1:1.05 to 1:2, a firing temperature may be 600° C. to 1000° C., a firing duration may be 5 hours to 30 hours, and a firing atmosphere may be an air atmosphere or an oxygen atmosphere, for example, an atmosphere containing oxygen at 20 to 100 vol %.

Examples of the lithium source material include a lithium-containing carbonate (e.g., lithium carbonate, etc.), a hydrate (e.g., lithium hydroxide hydrate ($LiOH \cdot H_2O$), etc.), a hydroxide (e.g., lithium hydroxide, etc.), a nitrate (e.g., lithium nitrate ($LiNO_3$), etc.), a chloride (e.g., lithium chloride (LiCl), etc.), and the like, which may be used alone or in combination of two or more thereof.

Meanwhile, the transition metal precursor may be in the form of a hydroxide, an oxide, or a carbonate. When a carbonate-type precursor is used, a positive electrode active material having a relatively high specific surface area may be prepared, and thus this case is more preferable.

The transition metal precursor may be prepared by a precipitation process. For example, the transition metal precursor may be prepared by dissolving each transition metal-containing source material in a solvent to prepare a metal solution, mixing the metal solution, an ammonium-cation-containing complex-forming agent, and a basic compound, and performing a precipitation reaction. Also, as necessary, an oxidant or oxygen gas may be further added in the precipitation reaction.

In this case, the transition metal-containing source material may be an acetate, carbonate, nitrate, sulfate, halide, sulfide, or the like of each transition metal. Specifically, the transition metal-containing source material may be NiO, $NiCO_3 \cdot 2Ni(OH)_2 \cdot 4H_2O$, $NiC_2O_2 \cdot 2H_2O$, $Ni(NO_{32} \cdot 6H_2O$, $NiSO_4$, $NiSO_4 \cdot 6H_2O$, $Mn_2O_3$, $MnO_2$, $Mn_3O_4$ $MnCO_3$, $Mn(NO_3)_2$, $MnSO_4 \cdot H_2O$, manganese acetate, a manganese halide, or the like.

The ammonium-cation-containing complex-forming agent may be at least one selected from the group consisting of $NH_4OH$, $(NH_4)_2SO_4$, $NH_4NO_3$, $NH_4Cl$, $CH_3COONH_4$, and $(NH_4)_2CO_3$.

The basic compound may be at least one selected from the group consisting of NaOH, $Na_2CO_3$, KOH, and $Ca(OH)_2$. The form of the precursor may vary depending on the type of the basic compound used. For example, when NaOH is used as the basic compound, a hydroxide-type precursor may be obtained, and when $Na_2CO_3$ is used as the basic compound, a carbonate-type precursor may be obtained. Also, when the basic compound and an oxidant are used together, an oxide-type precursor may be obtained.

Meanwhile, the positive electrode active material according to the present disclosure may be in the form of a secondary particle formed by agglomerating a plurality of primary particles, and the secondary particle may have an average particle ($D_{50}$) of 2 μm to 10 μm, preferably 2 μm to 8 μm, and more preferably 4 μm to 8 μm.

In addition, the positive electrode active material may have a BET specific surface area of 1 $m^2/g$ or more, preferably, 3 to 8 $m^2/g$ or 4 to 6 $m^2/g$.

Additionally, the positive electrode active material according to the present disclosure preferably has an initial irreversible capacity of 5 to 70%, 5 to 50%, or 10 to 30%. When the initial irreversible capacity of the positive electrode active material satisfies the above-described range, irreversible capacity of a silicon-based negative electrode may be compensated even without a separate compensation material such as a sacrificial positive electrode material or a prior lithium compensation process such as pre-lithiation.

Meanwhile, examples of the conductive material include spherical or flaky graphite; carbon-based materials such as carbon black, acetylene black, Ketjen black, channel black, furnace black, lamp black, thermal black, carbon fiber, single-walled carbon nanotubes, multi-walled carbon nanotubes, and the like; powders or fibers of metals such as copper, nickel, aluminum, silver, and the like; conductive whiskers such as zinc oxide, potassium titanate, and the like; conductive metal oxides such as titanium oxide and the like; and conductive polymers such as a polyphenylene derivative and the like, which may be used alone or in combination of two or more thereof. The conductive material may be included in an amount of 0.1 to 20 wt %, 1 to 20 wt %, or 1 to 10 wt % based on the total weight of the positive electrode active material layer.

In addition, examples of the binder include polyvinylidene fluoride (PVDF), a vinylidene fluoride-hexafluoropropylene copolymer (PVDF-co-HFP), polyvinyl alcohol, polyacrylonitrile, carboxymethylcellulose (CMC), starch, hydroxypropyl cellulose, regenerated cellulose, polyvinylpyrrolidone, polytetrafluoroethylene, polyethylene, polypropylene, an ethylene-propylene-diene monomer rubber (EPDM rubber), a sulfonated EPDM, styrene butadiene rubber (SBR), fluoro-rubber, and various copolymer thereof, which may be used alone or in combination of two or more thereof. The binder may be included in an amount of 1 to 20 wt %, 2 to 20 wt %, or 2 to 10 wt % based on the total weight of the positive electrode active material layer.

The above-described positive electrode according to the present disclosure may be manufactured by a method of manufacturing a positive electrode which is known in the art. For example, the positive electrode may be manufactured by dissolving or dispersing a positive electrode active material, a binder and/or a conductive material in a solvent to prepare a positive electrode slurry, applying the positive electrode slurry onto a positive electrode current collector, and drying and roll-pressing the same or by laminating, on a positive electrode current collector, a film obtained by casting the positive electrode slurry on a separate support and removing it from the support.

The positive electrode current collector is not particularly limited as long as it does not cause a chemical change in a battery and has conductivity. For example, stainless steel, aluminum, nickel, titanium, calcined carbon, aluminum or stainless steel whose surface has been treated with carbon, nickel, titanium, silver, or the like, or the like may be used as the positive electrode current collector. Also, the positive electrode current collector may typically have a thickness of 3 μm to 500 μm and have fine irregularities formed on the surface thereof to increase the adhesion to a positive electrode active material layer. For example, the positive electrode current collector may be used in any of various forms such as a film, a sheet, a foil, a net, a porous material, a foam, a non-woven fabric, and the like.

The solvent may be a solvent generally used in the art, and examples thereof include dimethyl sulfoxide (DMSO), isopropyl alcohol, N-methyl pyrrolidone (NMP), acetone, water, and the like, which may be used alone or in combination of two or more thereof. The usage amount of the solvent is sufficient as long as it is able to be adjusted so that a positive electrode mixture has an appropriate viscosity considering the thickness of an applied positive electrode mixture, manufacturing yield, workability, and the like and is not particularly limited.

Negative Electrode

The negative electrode according to the present disclosure includes a negative electrode active material layer including a negative electrode active material, and the negative electrode active material layer may further include a conductive material and/or a binder as necessary.

As the negative electrode active material, various negative electrode active materials used in the art, for example, a silicon-based negative electrode active material, a carbon-based negative electrode active material, a metal alloy, and the like, may be used.

Preferably, the negative electrode active material includes a silicon-based negative electrode active material.

The silicon-based negative electrode active material may be selected, for example, from the group consisting of Si, $SiO_m$ (wherein 0<m<2), a Si—C composite, a Si—$M^a$ alloy ($M^a$ is one or more selected from the group consisting of Al, Sn, Mg, Cu, Fe, Pb, Zn, Mn, Cr, Ti, and Ni), and a combination thereof.

In addition, the silicon-based negative electrode active material may be doped with $M^b$ metal, and the $M^b$ metal may be a Group 1 alkali metal element and/or a Group 2 alkaline earth metal element, for example, Li, Mg, or the like. Specifically, the silicon-based negative electrode active material may be $M^b$ metal-doped Si, $SiO_m$ (wherein 0<m<2), a Si—C composite, or the like. In the case of the metal-doped silicon-based negative electrode active material, although the capacity of the active material is degraded due to the doping element, a high energy density may be implemented due to high efficiency.

Additionally, the silicon-based negative electrode active material may further include a carbon coating layer on the particle surface. In this case, the amount of applied carbon may be 20 wt % or less, preferably, 0.1 to 20 wt % based on the total weight of the silicon-based negative electrode active material. The carbon coating layer may be formed by dry coating, wet coating, chemical vapor deposition (CVD), physical vapor deposition (PVD), atomic layer deposition (ALD), or the like.

In addition, the silicon-based negative electrode active material may have a particle size ($D_{50}$) of 3 to 8 um, preferably, 4 to 7 um, and the $D_{min}$ to $D_{max}$ thereof may be 0.5 to 30 um, preferably 0.5 to 20 um, and more preferably 1 to 15 um.

Additionally, the negative electrode may further include a carbon-based negative electrode active material as a negative electrode active material as necessary. The carbon-based negative electrode active material may be, for example, artificial graphite, natural graphite, graphitized carbon fiber, amorphous carbon, soft carbon, hard carbon, or the like, but the present disclosure is not limited thereto.

Meanwhile, the silicon-based negative electrode active material may be included in an amount of 1 to 100 wt %, 1 to 50 wt %, 1 to 30 wt %, 1 to 15 wt %, 10 to 70 wt %, or 10 to 50 wt % based on the total weight of the negative electrode active material.

The carbon-based negative electrode active material may be included in an amount of 0 to 99 wt %, 50 to 99 wt %, 70 to 99 wt %, 85 to 99 wt %, 30 to 90 wt %, or 50 to 90 wt % based on the total weight of the negative electrode active material.

According to an embodiment, the negative electrode active material may be a mixture of a silicon-based negative electrode active material and a carbon-based negative electrode active material, and a mixing ratio of the silicon-based negative electrode active material and the carbon-based negative electrode active material may be, by weight, 1:99 to 50:50, preferably, 3:97 to 30:70. When a mixing ratio of the silicon-based negative electrode active material and the carbon-based negative electrode active material satisfies the above-described range, the volume expansion of the silicon-based negative electrode active material is suppressed while enhancing capacity characteristics, and thus excellent cycle performance can be ensured.

The negative electrode active material may be included in an amount of 80 wt % to 99 wt % based on the total weight of the negative electrode active material layer. When the content of the negative electrode active material satisfies the above range, excellent capacity characteristics and electrochemical properties can be obtained.

Examples of the conductive material include spherical or flaky graphite; carbon-based materials such as carbon black, acetylene black, Ketjen black, channel black, furnace black, lamp black, thermal black, carbon fibers, single-walled carbon nanotubes, multi-walled carbon nanotubes, and the like; powders or fibers of metals such as copper, nickel, aluminum, silver, and the like; conductive whiskers such as zinc oxide, potassium titanate, and the like; conductive metal oxides such as titanium oxide and the like; or conductive polymers such as a polyphenylene derivative and the like, which may be used alone or in combination of two or more thereof. The conductive material may be included in an amount of 0.1 to 30 wt %, 1 to 20 wt %, or 1 to 10 wt % based on the total weight of the negative electrode active material layer.

Preferably, single-walled carbon nanotubes are used as the conductive material. When single-walled carbon nanotubes are used as the conductive material, a conductive path is uniformly formed on the negative electrode active material surface, and accordingly, an effect of improving cycle characteristics can be obtained.

Examples of the binder include polyvinylidene fluoride (PVDF), a vinylidene fluoride-hexafluoropropylene copolymer (PVDF-co-HFP), polyvinyl alcohol, polyacrylic acid, polyacrylamide, polyacrylonitrile, carboxymethylcellulose (CMC), starch, hydroxypropylcellulose, regenerated cellulose, polyvinylpyrrolidone, polytetrafluoroethylene, polyethylene, polypropylene, ethylene-propylene-diene monomer rubber (EPDM rubber), a sulfonated-EPDM, styrene butadiene rubber (SBR), fluoro-rubber, and various copolymers thereof, which may be used alone or in combination of two or more thereof. The binder may be included in an amount of 1 to 20 wt %, 2 to 20 wt %, or 2 to 10 wt % based on the total weight of the negative electrode active material layer.

The negative electrode may have a single negative electrode active material layer structure or a multi-layer structure including at least two negative electrode active material layers. In the case of the multi-layer structure including at least two negative electrode active material layers, the types and/or contents of the negative electrode active material, the binder and/or the conductive material in each layer may be different. For example, the negative electrode according to the present disclosure may be formed so that the content of the carbon-based negative electrode active material in the lower layer is higher than that in the upper layer, and the content of the silicon-based negative electrode active material in the upper layer is higher than that in the lower layer.

In this case, an effect of improving rapid charging characteristics can be obtained compared to a case where the negative electrode active material layer is formed in a single layer.

The negative electrode active material layer may have a porosity of 20% to 70% or 20% to 50%.

The negative electrode may be manufactured by a method of manufacturing a negative electrode known in the art. For example, the negative electrode may be manufactured by applying, onto a negative electrode current collector, a negative electrode slurry prepared by dissolving or dispersing a negative electrode active material, an optional binder, and an optional conductive material in a solvent and then pressing and drying the same or by laminating, on a negative electrode current collector, a film obtained by casting the negative electrode slurry on a separate support and removing it from the support.

The negative electrode current collector is not particularly limited as long as it does not cause a chemical change in a battery and has high conductivity. For example, copper, stainless steel, aluminum, nickel, titanium, calcined carbon, cooper or stainless steel whose surface has been treated with carbon, nickel, titanium, silver, or the like, an aluminum-cadmium alloy, or the like may be used. Also, the negative electrode current collector may typically have a thickness of 3 μm to 500 μm. Also, like the positive electrode current collector, the negative electrode current collector may have fine irregularities formed on the surface thereof to increase the cohesion of a negative electrode active material. For example, the negative electrode current collector may be used in any of various forms such as a film, a sheet, a foil, a net, a porous material, a foam, a non-woven fabric, and the like.

The solvent may be a solvent generally used in the art, and examples thereof include dimethyl sulfoxide (DMSO), isopropyl alcohol, N-methyl pyrrolidone (NMP), acetone, water, and the like, which may be used alone or in combination of two or more thereof. The usage amount of the solvent is sufficient as long as it is able to be adjusted so that a negative electrode slurry has an appropriate viscosity considering the thickness of an applied negative electrode mixture, manufacturing yield, workability, and the like and is not particularly limited.

Separator

The separator in the lithium secondary battery according to the present disclosure is intended to separate the negative electrode and the positive electrode and provide a passage through which lithium ions migrate, and any separator that is used as a separator in a typical lithium secondary battery may be used without particular limitation. Particularly, a separator that exhibits low resistance to the migration of electrolyte ions and has an excellent electrolyte impregnation ability is preferred. Specifically, a porous polymer film, for example, a porous polymer film made of a polyolefin-based polymer such as an ethylene homopolymer, a propylene homopolymer, an ethylene/butene copolymer, an ethylene/hexene copolymer, an ethylene/methacrylate copolymer, or the like, or a stacked structure having two or more layers thereof may be used. Alternatively, a typical porous non-woven fabric, for example, a non-woven fabric made of high-melting-point glass fiber, polyethylene terephthalate fiber, or the like, may be used. Alternatively, a coated separator including a ceramic component or a polymer material may be used to ensure heat resistance or mechanical strength, and optionally, the separator may be used in a single-layer or multi-layer structure.

The lithium secondary battery according to the present disclosure is useful in the field of portable devices such as mobile phones, notebook computers, digital cameras, and the like and electric vehicles such as hybrid electric vehicles (HEVs) and the like.

Accordingly, according to still another embodiment of the present disclosure, a battery module including the lithium secondary battery as a unit cell and a battery pack including the battery module are provided.

The battery module or battery pack may be used as a power source of one or more medium-to-large-sized devices selected from among a power tool; electric vehicles (EVs), hybrid electric vehicles, and plug-in hybrid electric vehicles (PHEVs); and energy storage systems.

The type of the lithium secondary battery according to the present disclosure may be, but is not particularly limited to, a cylindrical type using a can, a prismatic type, a pouch type, a coin type, or the like.

The lithium secondary battery according to the present disclosure may be used not only in a battery cell used as a power source of a small device but also as a unit battery in medium-to-large-sized battery modules including a plurality of battery cells.

Hereinafter, the present disclosure will be described in detail with reference to exemplary embodiments.

COMPARATIVE EXAMPLE 1

$LiPF_6$ was dissolved at 1.2 M in a non-aqueous organic solvent in which ethylene carbonate (EC):ethyl methyl carbonate (EMC): diethyl carbonate (DEC) were mixed in a volume ratio of 20:60:20, and then 0.5 wt % of vinylene carbonate (VC), 0.5 wt % of propanesultone (PS), 1 wt % of ethylene sulfate (ESa), 0.5 wt % of $LiBF_4$, 1 wt % of lithium difluorophosphate (LiDFP), and 3 wt % of fluorinated ethylene carbonate (FEC) were added to prepare a non-aqueous electrolyte.

COMPARATIVE EXAMPLE 2

A non-aqueous electrolyte was prepared in the same manner as in Comparative Example 1, except that an unsubstituted coumarin-based compound represented by Chemical Formula A was further added in an amount of 0.5 wt %.

<Chemical Formula A>

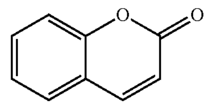

EXAMPLE 1

Anon-aqueous electrolyte was prepared in the same manner as in Comparative Example 1, except that a compound represented by Chemical Formula 1A was further added in an amount of 0.5 wt %.

EXAMPLE 2

Anon-aqueous electrolyte was prepared in the same manner as in Comparative Example 1, except that a compound represented by Chemical Formula 1A was further added in an amount of 1 wt %.

EXAMPLE 3

A non-aqueous electrolyte was prepared in the same manner as in Comparative Example 1, except that a compound represented by Chemical Formula 1B was further added in an amount of 0.5 wt %.

EXAMPLE 4

A non-aqueous electrolyte was prepared in the same manner as in Comparative Example 1, except that a compound represented by Chemical Formula 1C was further added in an amount of 0.5 wt %.

EXAMPLE 5

A non-aqueous electrolyte was prepared in the same manner as in Comparative Example 1, except that a compound represented by Chemical Formula 1D was further added in an amount of 0.5 wt %.

EXAMPLE 6

A non-aqueous electrolyte was prepared in the same manner as in Comparative Example 1, except that a compound represented by Chemical Formula 1E was further added in an amount of 0.5 wt %.

EXAMPLE 7

A non-aqueous electrolyte was prepared in the same manner as in Comparative Example 1, except that a compound represented by Chemical Formula 1F was further added in an amount of 0.5 wt %.

EXAMPLE 8

A non-aqueous electrolyte was prepared in the same manner as in Comparative Example 1, except that a compound represented by Chemical Formula 1G was further added in an amount of 0.5 wt %.

Fabrication of Lithium Secondary Battery (Manufacture of Positive Electrode)

A lithium-manganese-based oxide $Li_{1.3}(Ni_{0.35}Mn_{0.65})O_{2.33}$ as a positive electrode active material particle, carbon black as a conductive material, and polyvinylidene fluoride (PVDF) as a binder were added in a weight ratio of 96:1:3 to N-methyl-2-pyrrolidone (NMP) as a solvent to prepare a positive electrode active material slurry (solid content: 48 wt %). The positive electrode active material slurry was applied onto a positive electrode current collector (thin Al film), dried, and roll-pressed to manufacture a positive electrode.

(Manufacture of Negative Electrode)

Artificial graphite and SiOm (in a weight ratio of 94.5:5.5) as negative electrode active materials, PVDF as a binder, and carbon black as a conductive material were added in a weight ratio of 95:2:3 to NMP as a solvent to prepare a negative electrode active material slurry (solid content: 70 wt %). The negative electrode active material slurry was applied onto a negative electrode current collector (thin Cu film), dried, and roll-pressed to manufacture a negative electrode.

(Fabrication of Secondary Battery)

An electrode assembly was manufactured by a typical method in which the positive electrode and negative electrode manufactured by the above-described methods were sequentially stacked along with a porous polyethylene film, the electrode assembly was accommodated in a pouch-type secondary battery case, and each non-aqueous electrolyte prepared in Examples 1 to 8 and Comparative Examples 1 and 2 was injected to fabricate a lithium secondary battery.

EXPERIMENTAL EXAMPLE 1

Each lithium secondary battery fabricated above was stored at room temperature for 2 days (pre-aging process) so that the electrolyte was sufficiently impregnated. Afterward, the battery was subjected to charging at a temperature of 45° C. and a pressure of 0.5 kgf/cm$^2$ at 0.2 C up to SOC of 3%, charging at the same temperature and pressure at 0.3 C up to SOC of 17%, and charging at a pressure of 5 kgf/cm$^2$ at 0.3 C up to SOC of 30%. Then, film stabilization and gas discharging processes were performed while performing high-temperature aging at 60° C. for 15 hours.

Subsequently, charging was performed at a temperature of 45° C. and a pressure of 5 kgf/cm$^2$ at 0.3 C up to 4.6 V to activate the positive electrode, and then discharging was performed at 0.5 C up to 2 V to finish the activation process.

Meanwhile, the cell volume of the lithium secondary battery before and after the activation process was measured at room temperature using a buoyancy method, and a cell volume increase rate in the activation process was calculated by the following Equation (1).

Cell volume increase rate (%)={(Volume after positive electrode activation process−Initial cell volume)/Initial cell volume}×100    Equation (1)

Measurement results are shown in the following Table 1.

TABLE 1

| | Cell volume increase rate before and after activation process (%) |
|---|---|
| Comparative Example 1 | 158% |
| Comparative Example 2 | 134.3% |
| Example 1 | 116.9% |
| Example 2 | 112.2% |
| Example 3 | 118.5% |
| Example 4 | 124.8% |
| Example 5 | 113.8% |
| Example 6 | 115.3% |
| Example 7 | 118.5% |
| Example 8 | 83.7% |

Since charging is performed up to a high voltage of 4.6 V in the activation process, a reactive oxygen compound is generated at the positive electrode, and the reactive oxygen compound reacts with the electrolyte to generate gas such as CO and $CO_2$. As the amount of the reactive oxygen compound increases, the amount of generated gas increases, and thus cell volume increases. Therefore, a small increase in cell volume means that the amount of the reactive oxygen compound is small.

Referring to Table 1, it can be confirmed that the lithium secondary batteries of Examples 1 to 8 using a coumarin-based compound having at least one substituent as an additive exhibited a small increase in cell volume after the activation process compared to Comparative Examples 1 and 2, and this indicates that the coumarin-based compound having at least one substituent effectively removes reactive oxygen.

Meanwhile, Comparative Example 2 using an unsubstituted coumarin-based compound as an additive exhibited a low cell volume increase rate compared to Comparative Example 1 and a high cell volume increase rate compared to Examples 1 to 8. That is, it can be seen that when a coumarin-based compound having at least one substituent is used, the effect of suppressing gas generation is superior to that when an unsubstituted coumarin-based compound is used. It is determined that this is because a robust SEI film is formed on the electrode surface due to functional groups substituted in coumarin, and thus side reactions at an electrode interface are suppressed, thereby further suppressing the generation of activation gas.

EXPERIMENTAL EXAMPLE 2

Each lithium secondary battery fabricated above was activated in the same manner as in Experimental Example 1 and then fully charged at 25° C. under the condition of CC/CV, 0.33 C, and 4.35 V up to SOC of 100%. Afterward, the fully charged lithium secondary battery was stored at 60° C. for 8 weeks, and a cell volume increase rate and a capacity retention rate were measured.

In this case, the capacity retention rate was calculated by substituting the discharge capacity of the lithium secondary battery as measured before high-temperature storage and the discharge capacity of the lithium secondary battery as measured after high-temperature storage into the following Equation (2).

Capacity retention rate (%)=(Discharge capacity after high-temperature storage/Discharge capacity before high-temperature storage)×100 Equation (2)

The cell volume increase rate was calculated by substituting the initial volume before high-temperature storage and the volume after high-temperature storage into the following Equation (3).

Cell volume increase rate (%)={(Volume after high-temperature storage−Initial volume)/Initial volume}×100 Equation (3)

Measurement results are shown in the following Table 2.

TABLE 2

| | Volume increase rate (%) | Capacity retention rate (%) |
|---|---|---|
| Comparative Example 1 | 14.0 | 78.8 |
| Comparative Example 2 | 12.2 | 79.2 |
| Example 1 | 3.2 | 85.6 |
| Example 2 | 2.9 | 84.3 |
| Example 3 | 8.5 | 80.8 |
| Example 4 | 9.2 | 82.6 |
| Example 5 | 9.7 | 82.4 |
| Example 6 | 10.9 | 83.3 |
| Example 7 | 7.8 | 82.7 |
| Example 8 | 6.6 | 84.2 |

Referring to Table 2, it can be confirmed that the lithium secondary batteries of Examples 1 to 8 using a coumarin-based compound having at least one substituent as an additive exhibited a high capacity retention rate and a low cell volume increase rate after high-temperature storage compared to the lithium secondary batteries of Comparative Examples 1 and 2. It is determined that this is because a robust SEI film is formed on the electrode surface due to functional groups substituted in coumarin, and thus side reactions at an electrode interface are suppressed.

Since the coumarin-based compound of Chemical Formula 1 used as an additive of the non-aqueous electrolyte according to the present disclosure has a higher energy for reaction with reactive oxygen species than an organic solvent such as ethylene carbonate or the like, when reactive oxygen species are generated, the coumarin-based compound binds to the reactive oxygen species before the organic solvent does. Therefore, when the coumarin-based compound of Chemical Formula 1 is included in the non-aqueous electrolyte, the reactive oxygen species generated in a high-voltage battery can be scavenged by the coumarin-based compound to suppress the decomposition of an organic solvent caused by the reactive oxygen species, and accordingly, the generation of gas caused by the decomposition of an organic solvent or the production of resistor by-products can be minimized.

In addition, since the coumarin-based compound of Chemical Formula 1 includes a substituent including one or more elements selected from the group consisting of C, O, N, S, P, Si, and F, a SEI film is formed on the surface of a positive electrode and/or a negative electrode to suppress the direct contact between the electrode and the electrolyte, and thus an effect of reducing swelling and gas generation at high temperature and improving lifespan can be obtained.

When the non-aqueous electrolyte according to the present disclosure is applied to a lithium secondary battery using a lithium-manganese-rich oxide as a positive electrode active material, which requires an activation process at a high voltage of 4.6 V or more, a remarkably excellent effect of gas reduction and resistance reduction can be obtained.

What is claimed is:

1. A non-aqueous electrolyte comprising an organic solvent, a lithium salt, and a coumarin-based compound represented by Chemical Formula 1:

[Chemical Formula 1]

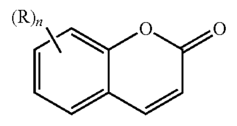

in Chemical Formula 1,

R is an alkynyl group having 2 to 10 carbon atoms, a propargyl group, COOR', O—R", or COR"', wherein R' is a propargyl group, R" is a propargyl group or a silyl group substituted with at least one alkyl group having 1 to 5 carbon atoms, wherein Si in the silyl group is attached to O in the O—R", and R"' is an alkyl group having 1 to 5 carbon atoms substituted with at least one halogen, and n is an integer of 1 to 6.

2. The non-aqueous electrolyte of claim 1, wherein the coumarin-based compound is a compound represented by Chemical Formula 1-1 or Chemical Formula 1-2:

[Chemical Formula 1-1]

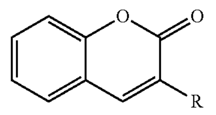

[Chemical Formula 1-2]

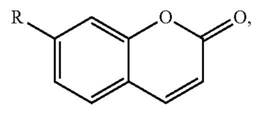

in Chemical Formula 1-1 or Chemical Formula 1-2,

R is defined the same as in Chemical Formula 1.

3. The non-aqueous electrolyte of claim 1, wherein the coumarin-based compound is selected from the group consisting of compounds represented by Chemical Formula 1B and Chemical Formula 1D to Chemical Formula 1G:

[Chemical Formula 1B]

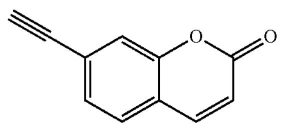

[Chemical Formula 1D]

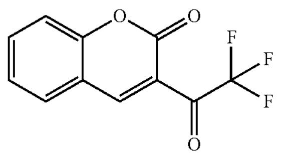

[Chemical Formula 1E]

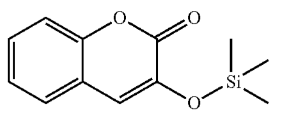

[Chemical Formula 1F]

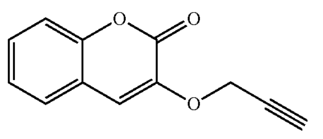

[Chemical Formula 1G]

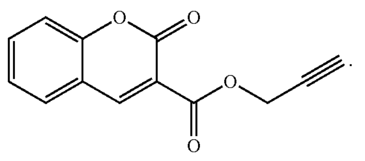

.

4. The non-aqueous electrolyte of claim 1, wherein the coumarin-based compound is included in an amount of 0.5 wt % to 3 wt % based on a total weight of the non-aqueous electrolyte.

5. The non-aqueous electrolyte of claim 1, further comprising a halogen-substituted cyclic carbonate.

6. The non-aqueous electrolyte of claim 5, wherein the halogen-substituted cyclic carbonate is fluorinated ethylene carbonate.

7. The non-aqueous electrolyte of claim 5, wherein the halogen-substituted cyclic carbonate is included in an amount of 0.5 to 10 wt % based on a total weight of the non-aqueous electrolyte.

8. A lithium secondary battery comprising:

a positive electrode including a positive electrode active material;

a negative electrode including a negative electrode active material; and the non-aqueous electrolyte according to claim 1.

9. The lithium secondary battery of claim 8, wherein the positive electrode active material includes a lithium-manganese-rich oxide including Mn in an amount of 50 mol % or more among all metals excluding lithium and having a molar ratio of lithium to a transition metal of more than 1.

10. The lithium secondary battery of claim 9, wherein the lithium-manganese-rich oxide is represented by Chemical Formula 2:

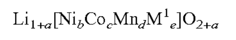

$Li_{1+a}[Ni_bCo_cMn_dM^1_e]O_{2+a}$ [Chemical Formula 2]

in Chemical Formula 2, $0.05 \leq a \leq 1$, $0 \leq b \leq 0.5$, $0 \leq c \leq 0.3$, $0.5 \leq d < 1.0$, and $0 \leq e \leq 0.2$ are satisfied, and $M^1$ is at least one selected from the group consisting of Al, B, Co, W, Mg, V, Ti, Zn, Ga, In, Ru, Nb, Sn, Sr, and Zr.

11. The lithium secondary battery of claim 9, wherein the lithium-manganese-rich oxide is represented by Chemical Formula 2-1:

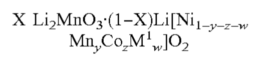

$X\ Li_2MnO_3 \cdot (1-X)Li[Ni_{1-y-z-w}Mn_yCo_zM^1_w]O_2$ [Chemical Formula 2-1]

in Chemical Formula 2-1, $0.1 \leq X < 0.5$, $0.5 \leq y < 1$, $0 \leq z \leq 0.3$, and $0 \leq w \leq 0.2$ are satisfied, and M1 is at least one selected from the group consisting of Al, B, Co, W, Mg, V, Ti, Zn, Ga, In, Ru, Nb, Sn, Sr, and Zr.

12. The lithium secondary battery of claim 8, wherein the negative electrode active material includes a silicon-based negative electrode active material.

13. The lithium secondary battery of claim 12, wherein the silicon-based negative electrode active material is selected from the group consisting of Si, $SiO_m$ (wherein $0 < m \leq 2$), a Si—C composite, a Si—$M^a$ alloy ($M^a$ is one or more selected from the group consisting of Al, Sn, Mg, Cu, Fe, Pb, Zn, Mn, Cr, Ti, and Ni), and a combination thereof.

14. The lithium secondary battery of claim 12, wherein the negative electrode active material further includes a carbon-based negative electrode active material.

* * * * *